United States Patent
Chen et al.

(10) Patent No.: US 11,550,204 B2
(45) Date of Patent: Jan. 10, 2023

(54) CAMERA AND LIGHT ADJUSTMENT MODULE

(71) Applicant: Chicony Electronics Co., Ltd., New Taipei (TW)

(72) Inventors: Chien-Yueh Chen, New Taipei (TW); Jin-Kae Jang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/375,481

(22) Filed: Jul. 14, 2021

(65) Prior Publication Data

US 2021/0341818 A1 Nov. 4, 2021

Related U.S. Application Data

(63) Continuation-in-part of application No. 16/929,876, filed on Jul. 15, 2020, now Pat. No. 11,112,680, (Continued)

(30) Foreign Application Priority Data

May 8, 2019 (TW) ................................. 108115958
Jan. 22, 2020 (TW) ................................. 109102553
Jun. 15, 2021 (TW) ................................. 110121771

(51) Int. Cl.
*F21K 5/06* (2006.01)
*G03B 15/05* (2021.01)
*H04N 5/225* (2006.01)

(52) U.S. Cl.
CPC ......... *G03B 15/0442* (2013.01); *G03B 15/05* (2013.01); *H04N 5/2254* (2013.01); *H04N 5/2256* (2013.01)

(58) Field of Classification Search
CPC ................ G03B 15/0442; G03B 15/05; G03B 2215/0575; G03B 2215/0592; H04N 5/2254; H04N 5/2256
See application file for complete search history.

(56) References Cited

U.S. PATENT DOCUMENTS 7,712,906 B1  5/2010  Larimer
8,761,594 B1 *  6/2014  Gross ................... H04N 5/2354
                                                                    396/155
(Continued)

FOREIGN PATENT DOCUMENTS

CN  1576898 A  2/2005
CN  102798002 A  11/2012
(Continued)

*Primary Examiner* — Amy R Hsu
(74) *Attorney, Agent, or Firm* — Muncy, Geissler, Olds & Lowe, P.C.

(57) ABSTRACT

A light adjustment module for a camera includes a light source unit and a light adjustment unit. The light source unit includes light emitting elements disposed around a lens of the camera, and the light direction of each of the light emitting elements is parallel to the image capturing direction of the lens. The light adjustment unit is disposed above the light source unit and includes secondary optical elements, and the secondary optical elements respectively correspond to the light emitting elements. The light emitted by each of light emitting elements is deflected through the corresponding secondary optical element. Each of the secondary optical elements includes a first ring-shaped prism and a second ring-shaped prism, the width of the second ring-shaped prism is greater than the width of the first ring-shaped prism, and the second ring-shaped prism surrounds the outer circumference of the first ring-shaped prism.

19 Claims, 8 Drawing Sheets

Related U.S. Application Data which is a continuation-in-part of application No. 16/595,693, filed on Oct. 8, 2019, now Pat. No. 11,095,826.

(56) References Cited

U.S. PATENT DOCUMENTS

| | | | |
|---|---|---|---|
| 9,664,838 B2 | 5/2017 | Kinoshita | |
| 2006/0083508 A1* | 4/2006 | Tenmyo | G03B 15/05 396/175 |
| 2015/0042897 A1* | 2/2015 | Namekata | G02F 1/133603 349/67 |
| 2015/0070493 A1 | 3/2015 | Chan | |
| 2015/0316776 A1* | 11/2015 | Gao | H04N 13/305 348/59 |
| 2016/0366316 A1* | 12/2016 | Chen | A61B 5/441 |
| 2018/0112848 A1* | 4/2018 | Streppel | F21V 5/007 |
| 2019/0227330 A1 | 7/2019 | Hu et al. | |
| 2020/0371408 A1* | 11/2020 | Iwaguchi | G06V 40/1324 |
| 2020/0404186 A1* | 12/2020 | Wakui | G02B 7/28 |

FOREIGN PATENT DOCUMENTS

| | | |
|---|---|---|
| CN | 103867969 A | 6/2014 |
| CN | 106707660 A | 5/2017 |
| CN | 107918459 A | 4/2018 |
| CN | 108124040 A | 6/2018 |
| CN | 208399869 U | 1/2019 |
| CN | 112540495 A | 3/2021 |
| TW | M586019 U | 11/2019 |

\* cited by examiner

CAMERA AND LIGHT ADJUSTMENT MODULE

CROSS-REFERENCE TO RELATED APPLICATION

This application is a continuation-in-part (CIP) of application Ser. No. 16/929,876, filed on Jul. 15, 2020 with claiming foreign priority of TW 109102553. Ser. No. 16/929,876 is a continuation-in-part (CIP) of application Ser. No. 16/595,693, filed on Oct. 8, 2019 with claiming foreign priority of TW 108115958. The prior application is herewith incorporated by reference in its entirety.

This non-provisional application claims priority under 35 U.S.C. § 119(a) to patent application No. 110121771 in Taiwan, R.O.C. on Jun. 15, 2021, the entire contents of which are hereby incorporated by reference.

BACKGROUND

Technical Field

The instant disclosure relates to an electronic device, in particular, to a camera and a light adjustment module for camera.

Related Art

Cameras are utilized along with auxiliary light sources for auxiliary illumination purpose. Hence, when cameras are utilized to capture images, clear images can be obtained by the aids from the illumination of the auxiliary light sources. Moreover, the auxiliary light source provides a sufficient brightness for capturing images at nighttime or insufficient light circumstances.

To allow the auxiliary light source to emit to a certain region or in a certain angle, the light source of the camera known to the inventor is provided with an insertion-type light emitting element having a pin structure (for instance, a DIP LED). During the manufacturing process of the camera, the pin structure of the insertion-type light emitting element is inserted to a circuit board, and then the pin structure is bent and fixed by soldering. Consequently, the insertion-type light emitting element can be oriented to a certain direction so as to emit to a certain region.

SUMMARY

However, the aforementioned procedure is time consuming and complicated (for instance, the bending step is required to be performed to every light emitting element). Furthermore, because the orientation alignment of the light emitting element is achieved by the bending step, the bending step may be performed mistakably to produce defected products, and the defected products may fail to perform the expected illumination performance. Moreover, the light emitted by the insertion-type light emitting element may have a non-uniform illumination; for instance, the light distant from the insertion-type light emitting element may be diffused to provide a poor illumination. As a result, the image quality of the image may be adversely affected.

In view of this, in one embodiment, a light adjustment module for camera is provided, and the light adjustment module is applicable to a camera. The light adjustment module comprises a light source unit and a light adjustment unit. The light source unit comprises a plurality of light emitting elements. The light emitting elements are disposed around a lens of the camera, and a light emitting direction of each of the light emitting elements is parallel to an image capturing direction of the lens. The light adjustment unit is disposed above the light source unit and comprises a plurality of secondary optical elements. The secondary optical elements respectively correspond to the light emitting elements. A light emitted by each of the light emitting elements is deflected through the corresponding secondary optical element. Each of the secondary optical elements comprises a first ring-shaped prism and a second ring-shaped prism, a width of the second ring-shaped prism is greater than a width of the first ring-shaped prism, and the second ring-shaped prism surrounds an outer periphery of the first ring-shaped prism.

In another one embodiment, a camera is provided. The camera comprises a camera body and the foregoing light adjustment module. The camera body has a lens, and the light adjustment module is disposed on the camera body.

Based on the above, according to one or some embodiments of the instant disclosure, each of the secondary optical elements of the light adjustment unit corresponds to the corresponding light emitting element, and the light emitted by each of the light emitting elements is deflected through the corresponding secondary optical element. Hence, the light adjustment unit guides the light emitted by each of the light emitting elements to achieve an expected illumination angle and intensity distribution, thereby optimizing the uniformness of the illumination to enhance the image quality of the captured image. Moreover, additional manufacturing processes (e.g., the pin-bending and turning procedure) for each of the light emitting elements are not necessarily required, thereby greatly reducing labor and time cost.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
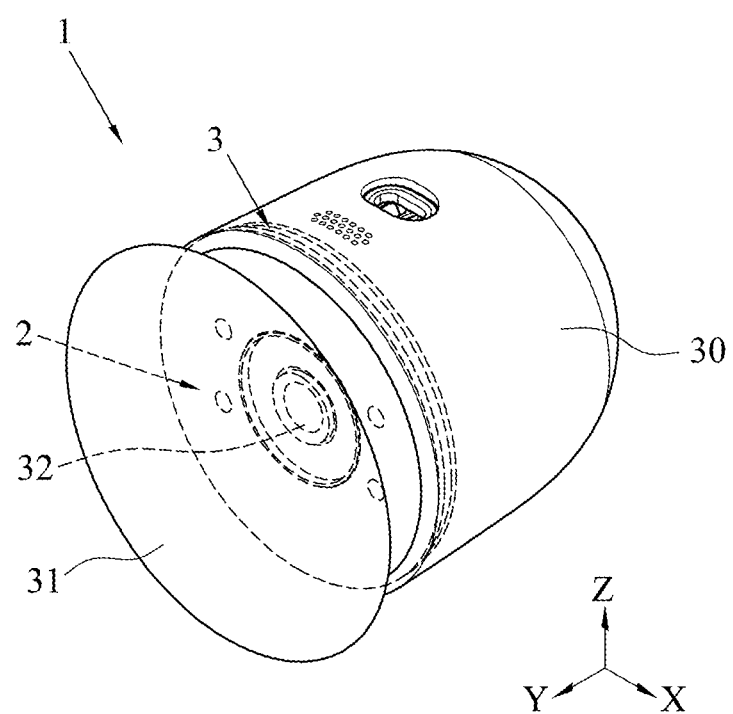
FIG. 1 illustrates a perspective view of a camera according to an exemplary embodiment of the instant disclosure.
Figure 2:
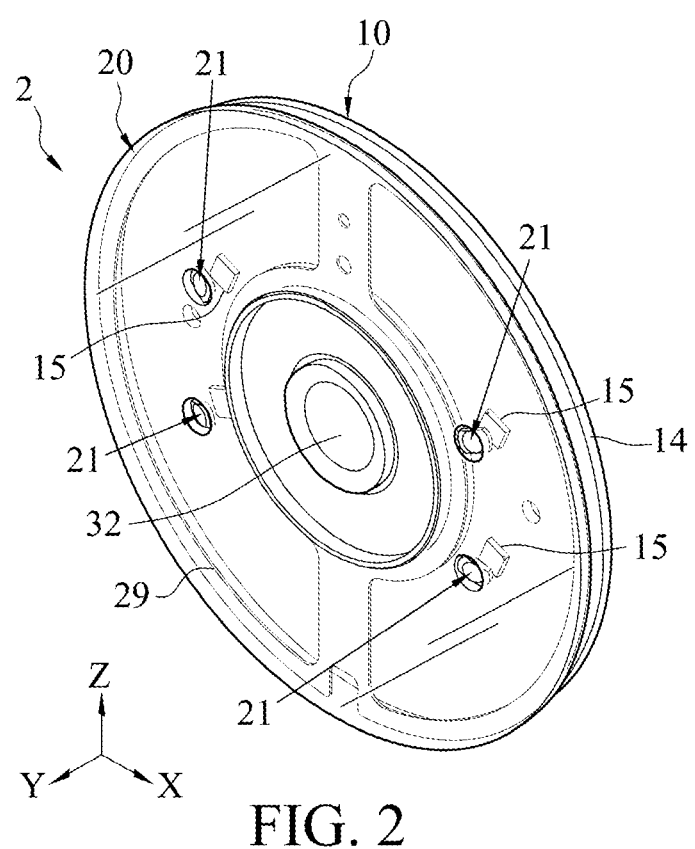
FIG. 2 illustrates a perspective view of a light adjustment module according to a first embodiment of the instant disclosure.
Figure 3:
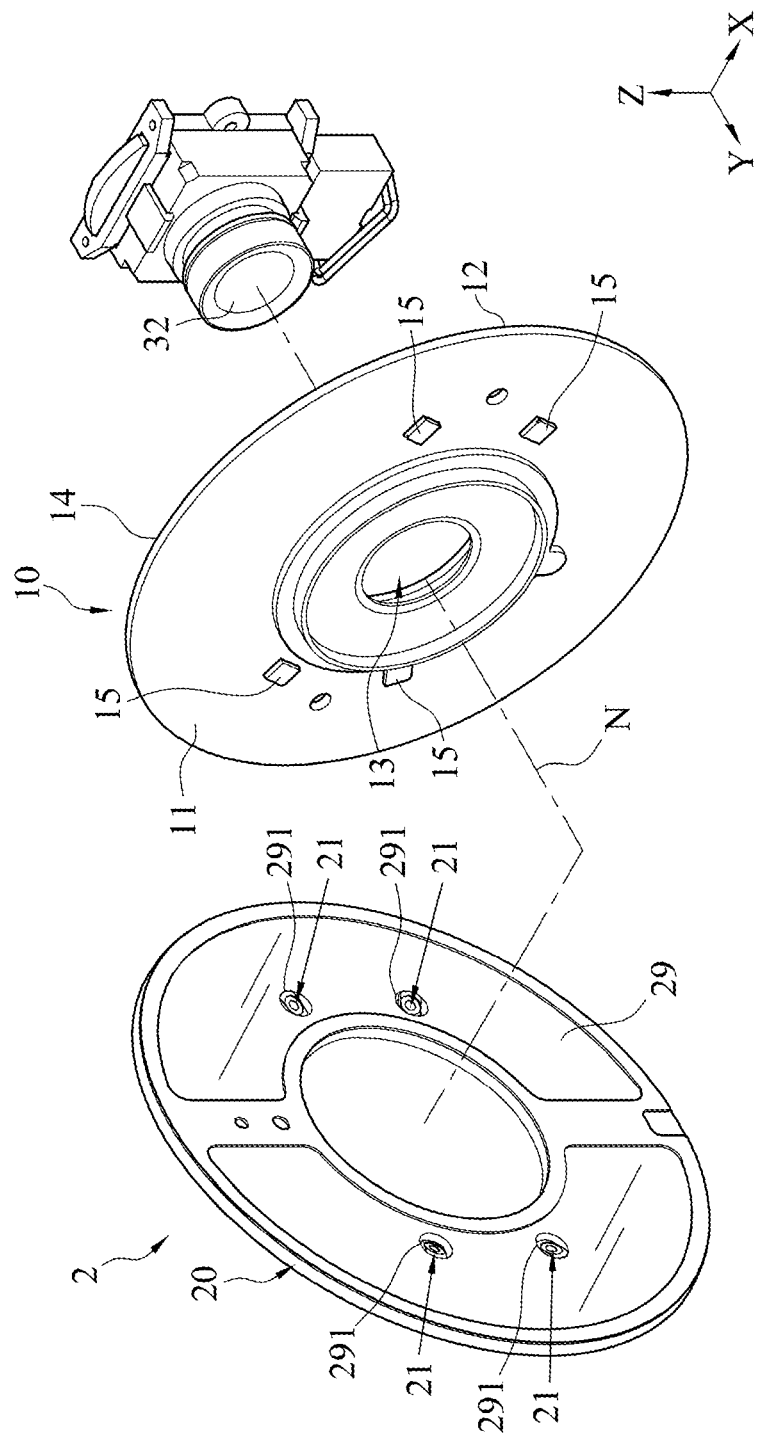
FIG. 3 illustrates an exploded view of the light adjustment module of the first embodiment.

FIG. 1 illustrates a perspective view of a camera according to an exemplary embodiment of the instant disclosure. FIG. 2 illustrates a perspective view of a light adjustment module according to a first embodiment of the instant disclosure. FIG. 3 illustrates an exploded view of the light adjustment module of the first embodiment. As shown in FIG. 1, in this embodiment, a camera 1 is provided and the camera 1 comprises a light adjustment module 2 and a camera body 3. In some embodiments, the camera 1 may be an IP camera or network camera, a closed-circuit television (CCTV), an analog monitor camera, etc. The camera 1 may be installed on different fields (e.g., nursey schools, offices, stores, roads, etc.), so that the personnel safety at the field can be monitored or the personnel activities at the field can be recorded.

As shown in FIGS. 1 to 3, the camera body 3 has a housing 30 and a lens 32. The housing 30 is hollowed and has an image capturing opening 31, the lens 32 is in the housing 30 and faces the image capturing opening 31. Lights outside the housing 30 can enter into the housing 30 through the image capturing opening 31, so that the lens 32 can capture images of the outside of the housing 30. The light adjustment module 2 is assembled on the housing 30 and comprises a light source unit 10 and a light adjustment unit 20. The light source unit 10 comprises a substrate 14 and a plurality of light emitting elements 15 disposed around the lens 32. The substrate 14 comprises a first surface 11 and a second surface 12 opposite to the first surface 11. In this embodiment, the substrate 14 is a printed circuit board, and each light emitting element 15 is a light emitting diode (LED) fixedly disposed on the first surface 11.

As shown in FIGS. 1 to 3, in this embodiment, a normal direction of the first surface 11 of the substrate 14 is parallel to an image capturing direction of the lens 32 (for instance, the Y axis direction shown in FIGS. 3 and 5), such that the light emitting direction of each light emitting element 15 is parallel to the image capturing direction of the lens 32. It is understood that, for each light emitting element 15, the light emitting direction is the maximum luminous intensity direction. In this embodiment, the number of the light emitting elements 15 is four, but embodiments are not limited thereto; according to different needs, the number of the light emitting elements 15 can be altered.

As shown in FIG. 3, the substrate 14 has a lens mount portion 13 for assembling the lens 32. In this embodiment, the lens mount portion 13 is a central through hole, such that the lens 32 is inserted into the lens mount portion 13, but embodiments are not limited thereto. Hence, the lens 32 can be prevented from being shielded and capable of capturing images of the outside of the housing 30. In some embodiments, the lens mount portion 13 of the substrate 14 may be a solid portion, so that the lens 32 can be assembled with the lens mount portion 13 directly and face toward the image capturing opening 31.

As shown in FIGS. 2 and 3, the lens 32 has a normal central axis N (in this embodiment, the axis direction of the normal central axis N is parallel to the Y axis direction shown in FIGS. 2 and 3). The image capturing direction of the lens 32 is the axis direction of the normal central axis N. The light emitting elements 15 are disposed around the normal central axis N equidistantly. In other words, the shortest distance between each of the light emitting elements 15 and the normal central axis N is the same, but embodiments are not limited thereto. In some embodiments, the positions of the light emitting elements 15 may be arranged differently according to needs. For example, the light emitting elements 15 may be disposed at a same side of the lens mount portion 13, disposed around the normal central axis N equiangularly (e.g., 30 degrees, 45 degrees, or 60 degrees), or disposed irregularly.

Figure 4:
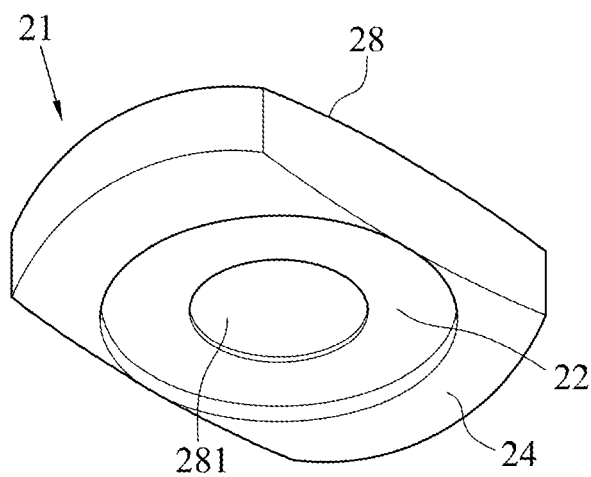
FIG. 4 illustrates a perspective view of a secondary optical element of the first embodiment.
Figure 5:
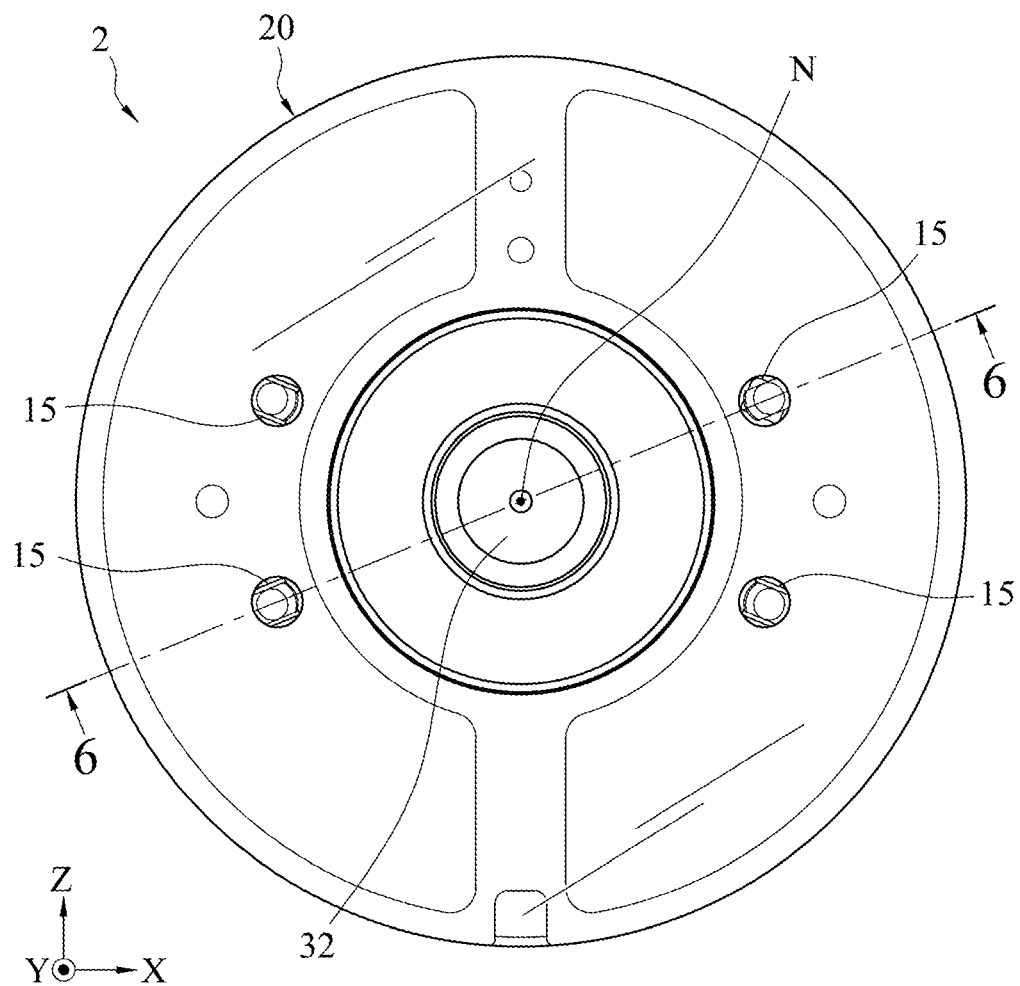
FIG. 5 illustrates a side view of the light adjustment module of the first embodiment.
Figure 6:
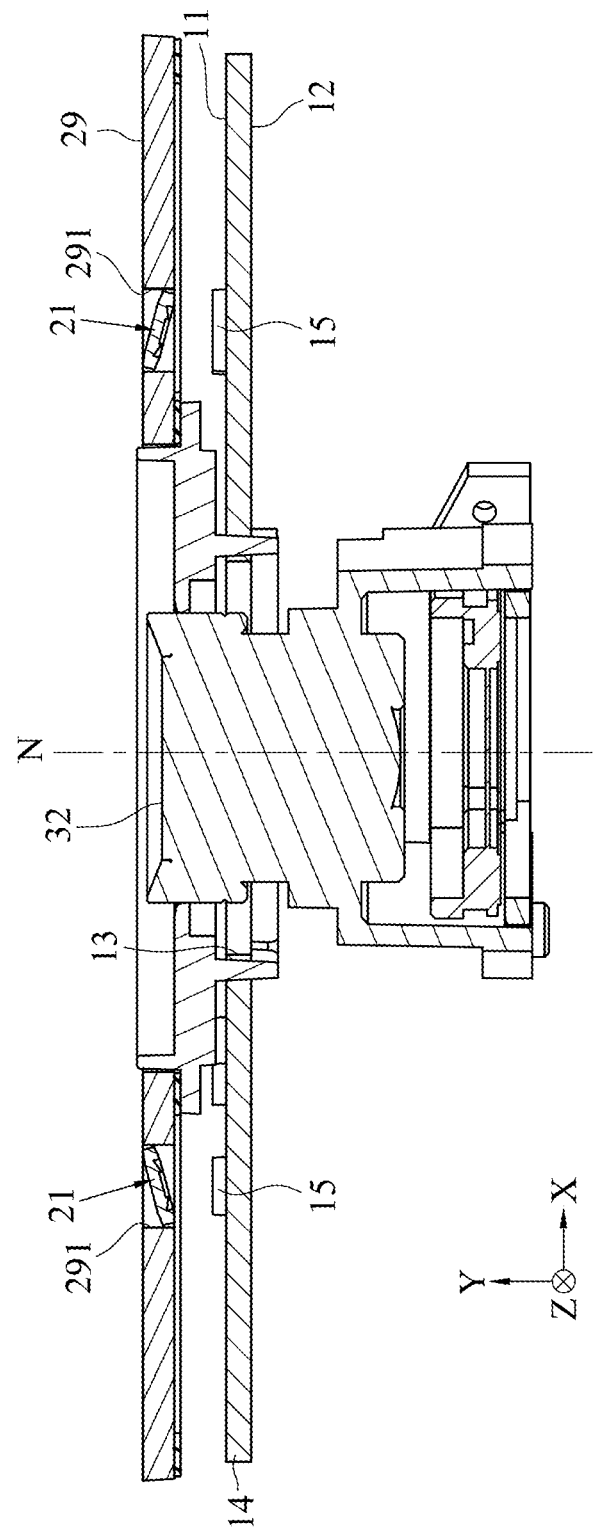
FIG. 6 illustrates a cross-sectional view of the light adjustment module along line 6-6 shown in FIG. 5.
Figure 7:
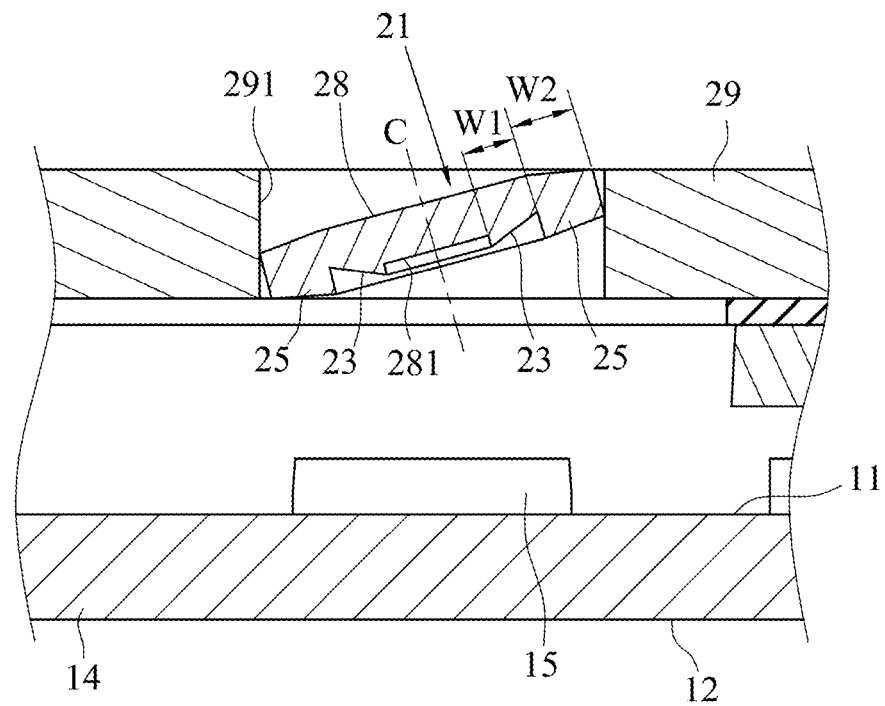
FIG. 7 illustrates an enlarged partial view of FIG. 6.

FIG. 4 illustrates a perspective view of a secondary optical element of the first embodiment. FIG. 5 illustrates a side view of the light adjustment module of the first embodiment. FIG. 6 illustrates a cross-sectional view of the light adjustment module along line 6-6 shown in FIG. 5. FIG. 7 illustrates an enlarged partial view of FIG. 6. As shown in FIGS. 2 to 7, the light adjustment unit 20 is disposed above the light source unit 10 and comprises a plurality of secondary optical elements 21. The secondary optical elements 21 respectively correspond to the light emitting elements 15. As shown in FIG. 4, each of the secondary optical elements 21 comprises a transparent substrate 28. The transparent substrate 28 is made of a transparent material, for example, the transparent material may be polycarbonate (PC), poly (methyl methacrylate) (PMMA), glass material, and so on. In some embodiments, the light adjustment unit 20 and the light source unit 10 are arranged along the image capturing direction of the lens 32 in a side-by-side manner, and the light adjustment unit 20 is located in front of the light source unit 10.

As shown in FIGS. 3 and 4, the transparent substrate 28 of each of the secondary optical elements 21 has a light-receiving surface 281 facing the corresponding light emitting element 15. Each of the secondary optical elements 21 further comprises a plurality of ring-shaped prisms (in this embodiment, the ring-shaped prisms are a first ring-shaped prism 22 and a second ring-shaped prism 24, but not limited to; the number of the ring-shaped prisms may be three or more according to needs). The ring-shaped prisms are disposed on the light-receiving surface 281, and the ring-shaped prisms have different widths and are concentrically arranged with each other. As shown in FIG. 4, the width of the second ring-shaped prism 24 is greater than the width of the first ring-shaped prism 22, and the second ring-shaped prism 24 surrounds and is connected to the outer periphery of the first ring-shaped prism 22.

In some embodiments, the first ring-shaped prism 22 and the second ring-shaped prism 24 may be circular-shaped, rectangular-shaped, elliptical-shaped, or other-shaped ring structures. As shown in FIG. 4, in this embodiment, the first ring-shaped prism 22 and the second ring-shaped prism 24 are circular ring-shaped, the diameter of the second ring-shaped prism 24 is greater than the diameter of the first ring-shaped prism 22, and the second ring-shaped prism 24 surrounds and is connected to the outer periphery of the first ring-shaped prism 22.

Furthermore, as shown in FIGS. 4 and 7, in this embodiment, the transparent substrate 28 of each of the secondary optical elements 21 has a central axis C, the first ring-shaped prism 22 is nearer to the central axis C as compared with the second ring-shaped prism 24. In other words, the distance between the first ring-shaped prism 22 and the central axis C is less than the distance between the second ring-shaped prism 24 and the central axis C. The first ring-shaped prism 22 and the second ring-shaped prism 24 are concentrically arranged with each other by taking the central axis C as the center. Moreover, the cross section of the first ring-shaped prism 22 of each of the secondary optical elements 21 is dentate and comprises two first tooth portions 23, and the two first tooth portions 23 are respectively at two opposite sides of the central axis C. The cross section of each of the first tooth portions 23 may be a triangle, a rectangle, a polygon, or other irregular shapes. Likewise, the cross section of the second ring-shaped prism 24 of each of the secondary optical elements 21 is dentate and comprises two second tooth portions 25, and the two second tooth portions 25 are respectively adjacent to the two first tooth portions 23. The cross section of each of the second tooth portions 25 may be a triangle, a rectangle, a polygon, or other irregular shapes. In some embodiments, the shape of the first tooth portion 23 may be the same as or different from the shape of the second tooth portion 25.

Accordingly, the light emitted by each of the light emitting elements 15 is deflected through the ring-shaped prisms on the corresponding secondary optical element 21. Hence, the light emitted by each of the light emitting elements 15 is guided by the corresponding secondary optical element 21 to achieve expected illumination angle and position. The ring-shaped prisms of each of the secondary optical elements 21 may be configured to guide the light emitted by the corresponding light emitting element 15 to illuminate a certain region of the image capturing region of the camera 1. For example, the light emitted by each of the light emitting elements 15 is emitted to one of the quadrants of the image capturing region of the camera 1. Alternatively, in another embodiment, the light emitted by each of the light emitting elements 15 can be guided by the corresponding secondary optical element 21, so that the brightness in the predetermined illumination region of the camera 1 can be uniform, thereby greatly enhancing the image quality of the captured image.

Moreover, according to one or some embodiments of the instant disclosure, the light illumination can be controlled by configuring each of the secondary optical elements 21 corresponding to the corresponding light emitting element 15. Hence, additional manufacturing processes (e.g., the pin-bending and turning procedure) for each light emitting element 15 are not necessarily required. As shown in FIGS. 6 and 7, in this embodiment, each light emitting element 15 may be a surface-mount technology (SMT) LED, such that each light emitting element 15 can be attached on the first surface 11 of the substrate 14 quickly during the manufacturing, thereby greatly reducing labor and time cost.

As shown in FIGS. 2 to 7, the light adjustment unit 20 further comprises a transparent cover 29 disposed on one side of the first surface 11 of the substrate 14. The transparent cover 29 covers the light source unit 10. The transparent cover 29 may have a plurality of holes 291, and the secondary optical elements 21 are respectively fixed in the holes 291, such that the secondary optical elements 21 are disposed around the normal central axis N equidistantly. For example, the secondary optical elements 21 may be fixed in the holes 291 by adhering, engaging, ultrasonic welding, or the like. In some embodiments, the transparent cover 29 and the secondary optical elements 21 are a one-piece structure (for example, the transparent cover 29 and the secondary optical elements 21 may be integrally formed with each other by injection molding).

In some embodiments, the transparent cover 29 is made of transparent material. For instance, the transparent material may be polycarbonate (PC), poly(methyl methacrylate) (PMMA), glass material, and so on, so that some of the light emitted by each of the light emitting elements 15 can pass the transparent cover 29, and then the light can illuminate outwardly from the image capturing opening 31. Hence, the auxiliary illumination function can be achieved.

In some embodiments, by configuring the ring-shaped prisms of each of the secondary optical elements 21 to have different shape or number, the light emitted by each of the light emitting elements 15 can have a different deflection effect from one another so as to satisfy different expected illumination angles and positions. Moreover, by configuring the secondary optical elements 21 to have different inclined angles, the lights emitted by the light emitting elements 15 can also have different deflection effects so as to satisfy different expected illumination angles and positions. Descriptions are provided in the following paragraphs with accompanied figures.

For example, at least two of the secondary optical elements 21 of the light adjustment unit 20 may have different inclined angles, or each of the second optical elements 21 of the light adjustment unit 20 may have a different angle from one another. Hence, the lights emitted by the light emitting elements 15 can have different deflection effects. For example, as shown in FIGS. 2, 3, and 6, in this embodiment, the number of the secondary optical elements 21 of the light adjustment unit 20 is four, and the four secondary optical elements 21 have different inclined angles from one another and the inclined angles respectively correspond to different positions within the image capturing region of the camera 1 (for instance, the inclined angles correspond to different quadrants of the image capturing region of the camera 1), so that the lights emitted by the light emitting elements 15 are respectively guided by the secondary optical elements 21 to illuminate different positions within the image capturing region of the camera 1.

As shown in FIGS. 4 and 7, the first tooth portion 23 of the first ring-shaped prism 22 and the second tooth portion 25 of the second ring-shaped prism 24 may have different shapes, so that the lights emitted by the light emitting elements 15 can have different deflection effects so as to satisfy different needs. For example, in this embodiment, the cross-section of the first tooth portion 23 of the first ring-shaped prism 22 is a triangle, and the cross-section of the second tooth portion 25 of the second ring-shaped prism 24 is a rectangle, so that the shape of the first tooth portion 23 of the first ring-shaped prism 22 is different from the shape of the second tooth portion 25 of the second ring-shaped prism 24.

Furthermore, as shown in FIG. 7, the first tooth portion 23 of the first ring-shaped prism 22 has a first tooth width W1, and the first tooth width W1 may be the maximum width of the first tooth portion 23. Likewise, the second tooth portion 25 of the second ring-shaped prism 24 has a second tooth width W2, and the second tooth width W2 may be the maximum width of the second tooth portion 25. In this embodiment, the first tooth width W1 is less than the second tooth width W2, so that the shape of the first tooth portion 23 of the first ring-shaped prism 22 is different from the shape of the second tooth portion 25 of the second ring-shaped prism 24. In some embodiment, the first tooth width W1 of the first tooth portion 23 may be, but not limited to, equal to the second tooth width W2 of the second tooth portion 25.

Figure 8:
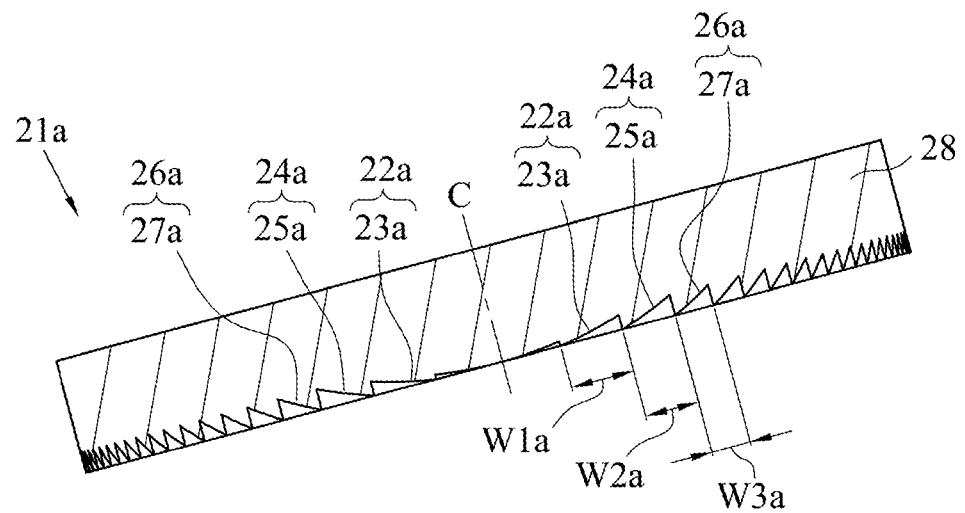
FIG. 8 illustrates a cross-sectional view of a secondary optical element according to a second embodiment of the instant disclosure.

Please refer to FIG. 8. FIG. 8 illustrates a cross-sectional view of a secondary optical element according to a second embodiment of the instant disclosure. The difference between the second embodiment and the first embodiment is at least that, in this embodiment, the secondary optical element 21a comprises three or more ring-shaped prisms, and the tooth widths of the ring-shaped prisms are gradually reduced from the central axis C to the outer periphery of the assembly of the ring-shaped prisms. In other words, in this embodiment, the ring-shaped prism which is farer away from the central axis C will have a smaller tooth width. Specifically, in this embodiment, by taking the first ring-shaped prism 22a, the second ring-shaped prism 24a, and the third ring-shaped prism 26a of the secondary optical element 21a as an illustrative example, the first ring-shaped prism 22a is closest to the central axis C, the width of the second ring-shaped prism 24a is greater than the width of the first ring-shaped prism 22a, and the width of the third ring-shaped prism 26a is greater than the width of the second ring-shaped prism 24a. Moreover, the second ring-shaped prism 24a surrounds and is connected to the outer periphery of the first ring-shaped prism 22a, and the third ring-shaped prism 26a surrounds and is connected to the outer periphery of the second ring-shaped prism 24a. Other ring-shaped prisms of each of the secondary optical elements 21a are arranged in a similar manner, and descriptions are omitted.

Moreover, as shown in FIG. 8, the first tooth width W1a of each of the first tooth portions 23a of the first ring-shaped prism 22a is greater than the second tooth width W2a of each of the second tooth portions 25a of the second ring-shaped prism 24a, and the second tooth width W2a of each of the second tooth portions 25a of the second ring-shaped prism 24a is greater than the third tooth width W3a of each of the third tooth portions 27a of the third ring-shaped prism 26a. Therefore, the shape of the first tooth portion 23a, the shape of the second tooth portion 25a, and the shape of the third tooth portion 27a are different from each other, and the ring-shaped prism which is farer away from the central axis C will have a smaller tooth width. Accordingly, the secondary optical element 21a in the second embodiment, as compared with the secondary optical element 21 in the first embodiment, the number, the shape, and the tooth width of the ring-shaped prisms are all different from each other, so that the light emitted by the light emitting elements 15 can have a different deflection effect to satisfy different expected illumination angles and positions.

Figure 9:
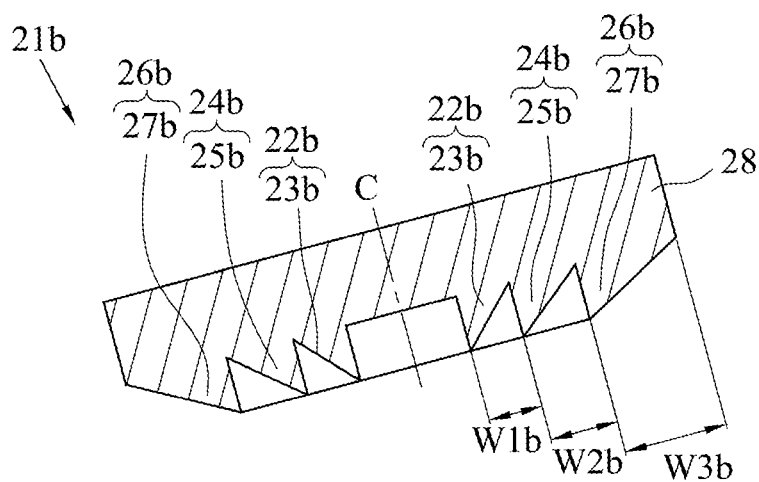
FIG. 9 illustrates a cross-sectional view of a secondary optical element according to a third embodiment of the instant disclosure.

Please refer to FIG. 9. FIG. 9 illustrates a cross-sectional view of a secondary optical element according to a third embodiment of the instant disclosure. The difference between the third embodiment and the first and second embodiments is at least that, in this embodiment, the secondary optical element 21b comprises three ring-shaped prisms (the first ring-shaped prism 22b, the second ring-shaped prism 24b, and the third ring-shaped prism 26b), and the tooth widths of the three ring-shaped prisms are gradually increased from the central axis C to the outer periphery of the assembly of the ring-shaped prisms. In other words, in this embodiment, the ring-shaped prism which is farer away from the central axis C will have a larger tooth width. Specifically, in this embodiment, the first ring-shaped prism 22b is closest to the central axis C, the width of the second ring-shaped prism 24b is greater than the width of the first ring-shaped prism 22b, and the width of the third ring-shaped prism 26b is greater than the width of the second ring-shaped prism 24b. Moreover, the second ring-shaped prism 24b surrounds and is connected to the outer periphery of the first ring-shaped prism 22b, and the third ring-shaped prism 26b surrounds and is connected to the outer periphery of the second ring-shaped prism 24b. Moreover, the first tooth width W1b of each of the first tooth portions 23b of the first ring-shaped prism 22b is less than the second tooth width W2b of each of the second tooth portions 25b of the second ring-shaped prism 24b, and the second tooth width W2b of each of the second tooth portions 25b of the second ring-shaped prism 24b is less than the third tooth width W3b of each of the third tooth portions 27b of the third ring-shaped prism 26b. Therefore, the shape of the first tooth portion 23b, the shape of the second tooth portion 25b, and the shape of the third tooth portion 27b are different from each other, and the ring-shaped prism which is farer away from the central axis C will have a larger tooth width. Accordingly, the secondary optical element 21a in the third embodiment, as compared with the secondary optical element 21 in the first and second embodiments, the number, the shape, and the tooth width of the ring-shaped prisms are all different from each other, so that the light emitted by the light emitting elements 15 can have a different deflection effect to satisfy different expected illumination angles and positions.

Figure 10:
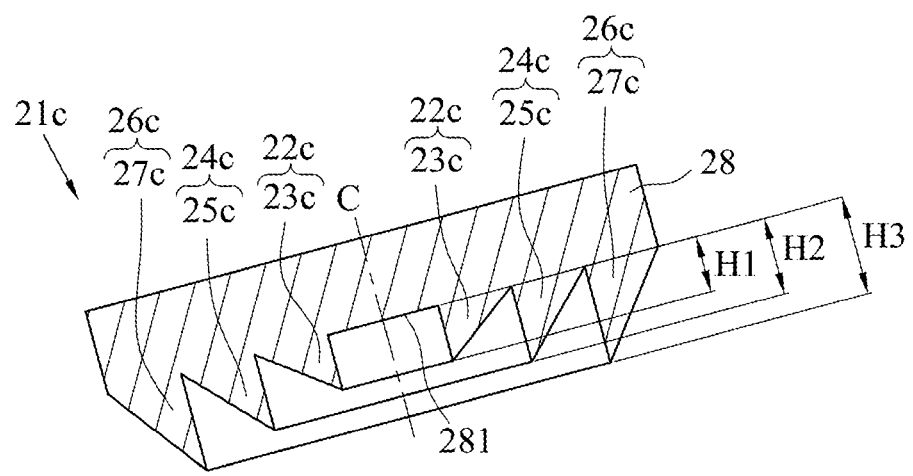
FIG. 10 illustrates a cross-sectional view of a secondary optical element according to a fourth embodiment of the instant disclosure.

Please refer to FIG. 10. FIG. 10 illustrates a cross-sectional view of a secondary optical element according to a fourth embodiment of the instant disclosure. The difference between the fourth embodiment and the first to third embodiments is at least that, in this embodiment, the secondary optical element 21c comprises three ring-shaped prisms (the first ring-shaped prism 22c, the second ring-shaped prism 24c, and the third ring-shaped prism 26c), and the tooth heights of the three ring-shaped prisms are different from each other. In this embodiment, the tooth heights of the three ring-shaped prisms are gradually increased from the central axis C to the outer periphery of the assembly of the three ring-shaped prisms. In other words, in this embodiment, the ring-shaped prism which is farer away from the central axis C will have a larger tooth height. In this embodiment, the tooth height may be the maximum height of the portion of the ring-shaped prism protruding from the light-receiving surface 281 of the transparent substrate 28.

As shown in FIG. 10, in this embodiment, the first ring-shaped prism 22c is closest to the central axis C, the width of the second ring-shaped prism 24c is greater than the width of the first ring-shaped prism 22c, and the width of the third ring-shaped prism 26c is greater than the width of the second ring-shaped prism 24c. Moreover, the second ring-shaped prism 24c surrounds and is connected to the outer periphery of the first ring-shaped prism 22c, and the third ring-shaped prism 26c surrounds and is connected to the outer periphery of the second ring-shaped prism 24c. Moreover, the first tooth height H1 of each of the first tooth portions 23c of the first ring-shaped prism 22c is less than the second tooth height H2 of each of the second tooth portions 25c of the second ring-shaped prism 24c, and the second tooth height H2 of each of the second tooth portions 25c of the second ring-shaped prism 24c is less than the third tooth height H3 of each of the third tooth portions 27c of the third ring-shaped prism 26c. Therefore, the shape of the first tooth portion 23c, the shape of the second tooth portion 25c, and the shape of the third tooth portion 27c are different from each other, and the ring-shaped prism which is farer away from the central axis C will have a larger tooth height. Accordingly, the secondary optical element 21c in the fourth embodiment, as compared with the secondary optical elements in the first to third embodiments, the shape and the tooth height of the ring-shaped prisms are all different from each other, so that the light emitted by the light emitting elements 15 can have a different deflection effect to satisfy different expected illumination angles and positions.

Figure 11:
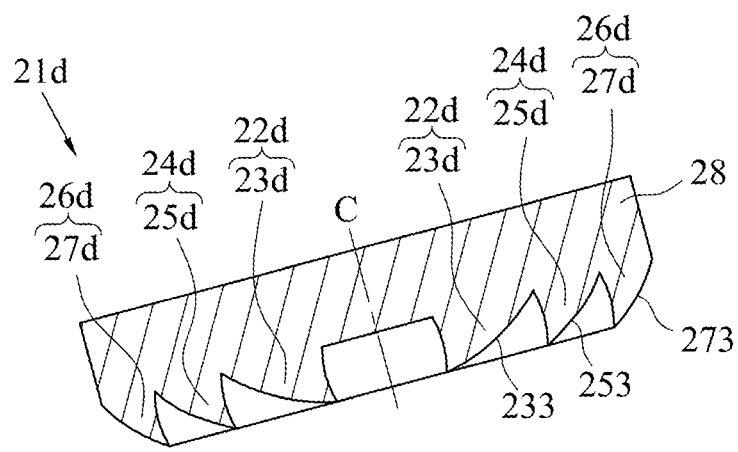
FIG. 11 illustrates a cross-sectional view of a secondary optical element according to a fifth embodiment of the instant disclosure.

Please refer to FIG. 11. FIG. 11 illustrates a cross-sectional view of a secondary optical element according to a fifth embodiment of the instant disclosure. The difference between the fifth embodiment and the first to fourth embodiments is at least that, in this embodiment, the secondary optical element 21d comprises three ring-shaped prisms (the first ring-shaped prism 22d, the second ring-shaped prism 24d, and the third ring-shaped prism 26d). The first tooth portion 23d of the first ring-shaped prism 22d has a first side face 233 (in this embodiment, the first side face 233 is a side face of the first tooth portion 23d away from the central axis C, but not limited to; in other embodiments, the first side face 233 may be the side face of the first tooth portion 23d closer to the central axis C). Likewise, the second tooth portion 25d of the second ring-shaped prism 24d has a second side face 253 (in this embodiment, the second side face 253 is a side face of the second tooth portion 25d away from the central axis C, but not limited to; in other embodiments, the second side face 253 may be the side face of the second tooth portion 25d closer to the central axis C). Likewise, the third tooth portion 27d of the third ring-shaped prism 26d has a third side face 273 (in this embodiment, the third side face 273 is a side face of the third tooth portion 27d away from the central axis C, but not limited to; in other embodiments, the third side face 253 may be the side face of the third tooth portion 27d closer to the central axis C). Moreover, the curvature of the first side face 233, the curvature of the second side face 253, and the curvature of the third side face 273 are different from each other. Accordingly, the secondary optical element 21d in the fifth embodiment, as compared with the secondary optical elements in the first to fourth embodiments, the shape and the curvature of the ring-shaped prisms are all different from each other, so that the light emitted by the light emitting elements 15 can have a different deflection effect to satisfy different expected illumination angles and positions.

Figure 12:
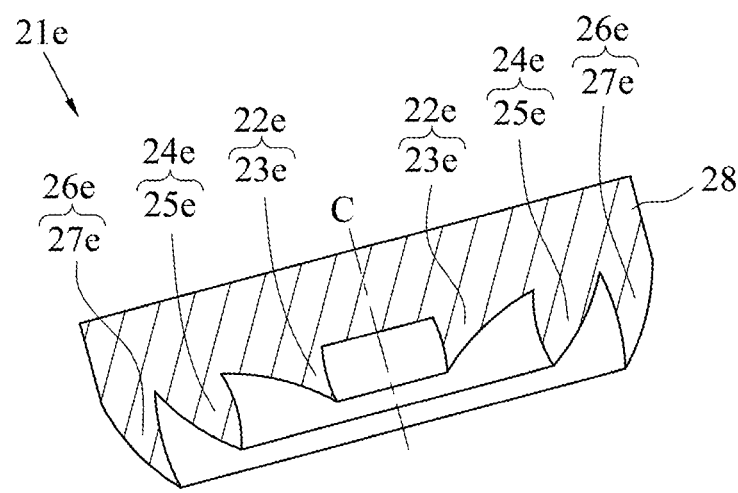
FIG. 12 illustrates a cross-sectional view of a secondary optical element according to a sixth embodiment of the instant disclosure.

Please refer to FIG. 12. FIG. 12 illustrates a cross-sectional view of a secondary optical element according to a sixth embodiment of the instant disclosure. The difference between the sixth embodiment and the first to fifth embodiments is at least that, in this embodiment, the secondary optical element 21e comprises three ring-shaped prisms (the first ring-shaped prism 22e, the second ring-shaped prism 24e, and the third ring-shaped prism 26e). The first tooth portion 23e of the first ring-shaped prism 22e, the second tooth portion 25e of the second ring-shaped prism 24e, and the third tooth portion 27e of the third ring-shaped prism 26e have different tooth widths, different tooth heights, and different curvatures of the side faces. Therefore, not only the shape of the first tooth portion 23e, the shape of the second tooth portion 25e, and the shape of the third tooth portion 27e are different from each other, but also the shape of the secondary optical element 21e in the sixth embodiment is different from the shape of the secondary optical elements in the foregoing embodiments. Accordingly, as compared with the secondary optical elements in the first to fifth embodiments, in this embodiment, the light emitted by the light emitting elements 15 can have a different deflection effect to satisfy different expected illumination angles and positions.

As above, in the light adjustment module for camera according to one or some embodiments of the instant disclosure, the ring-shaped prisms of each of the secondary optical elements are configured to have different shapes (e.g., the ring-shaped prisms of each of the secondary optical elements are configured to have different tooth width, different tooth height, and/or different curvature of the side face), so that the light adjustment unit can guide the light emitted by each of the light emitting elements to achieve different expected illumination angles and intensity distributions, thereby capable of eliminating additional manufacturing processes (e.g., the pin-bending and turning procedure) for each of the light emitting elements.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A light adjustment module for camera applicable to a camera, the light adjustment module comprising:
    a light source unit comprising a plurality of light emitting elements disposed around a lens of the camera, wherein a light emitting direction of each of the light emitting elements is parallel to an image capturing direction of the lens; and
    a light adjustment unit disposed above the light source unit and comprising a plurality of secondary optical elements, wherein the secondary optical elements respectively correspond to each of light emitting elements, and a light emitted by each of the light emitting elements is deflected through the corresponding secondary optical element;
    wherein each of the secondary optical elements comprises a first ring-shaped prism and a second ring-shaped prism, a width of the second ring-shaped prism is greater than a width of the first ring-shaped prism, and the second ring-shaped prism surrounds an outer periphery of the first ring-shaped prism;
    wherein at least two of the second optical elements have different inclined angles.

2. The light adjustment module for camera according to claim 1, wherein each of the secondary optical elements comprises a transparent substrate, the transparent substrate has a light-receiving surface facing the corresponding light emitting element, and the first ring-shaped prism and the second ring-shaped prism are disposed on the light-receiving surface.

3. The light adjustment module for camera according to claim 2, wherein a cross section of the first ring-shaped prism is dentate and comprises a first tooth portion, and a cross section of the second ring-shaped prism is dentate and comprises a second tooth portion adjacent to the first tooth portion.

4. The light adjustment module for camera according to claim 3, wherein a shape of the first tooth portion is different from a shape of the second tooth portion.

5. The light adjustment module for camera according to claim 4, wherein the first tooth portion has a first tooth width, the second tooth portion has a second tooth width, and the first tooth width is different from the second tooth width.

6. The light adjustment module for camera according to claim 4, wherein the first tooth portion has a first tooth height, the second tooth portion has a second tooth height, and the first tooth height is different from the second tooth height.

7. The light adjustment module for camera according to claim 4, wherein the first tooth portion has a first side face, the second tooth portion has a second side face, and a curvature of the first side face is different form a curvature of the second side face.

8. The light adjustment module for camera according to claim 3, wherein each of the secondary optical elements comprises a third ring-shaped prism, a width of the third ring-shaped prism is greater than the width of the second ring-shaped prism, the third ring-shaped prism surrounds an outer periphery of the second ring-shaped prism, and a cross-section of the third ring-shaped prism is dentate and comprises a third tooth portion adjacent to the second tooth portion.

9. The light adjustment module for camera according to claim 8, wherein a shape of the first tooth portion, a shape of the second tooth portion, and a shape of the third tooth portion are different from each other.

10. A camera comprising:
a camera body having a lens; and
a light adjustment module for camera according to claim 1, wherein the light adjustment module is disposed on the camera body.

11. The camera according to claim 10, wherein each of the secondary optical elements comprises a transparent substrate, the transparent substrate has a light-receiving surface facing the corresponding light emitting element, and the first ring-shaped prism and the second ring-shaped prism are disposed on the light-receiving surface.

12. The camera according to claim 11, wherein a cross section of the first ring-shaped prism is dentate and comprises a first tooth portion, and a cross section of the second ring-shaped prism is dentate and comprises a second tooth portion adjacent to the first tooth portion.

13. The camera according to claim 12, wherein a shape of the first tooth portion is different from a shape of the second tooth portion.

14. The camera according to claim 13, wherein the first tooth portion has a first tooth width, the second tooth portion has a second tooth width; wherein the transparent substrate has a central axis, the first ring-shaped prism is nearer to the central axis as compared with the second ring-shaped prism, and the first tooth width is greater than the second tooth width.

15. The camera according to claim 13, wherein the first tooth portion has a first tooth width, the second tooth portion has a second tooth width; wherein the transparent substrate has a central axis, the first ring-shaped prism is nearer to the central axis as compared with the second ring-shaped prism, and the first tooth width is less than the second tooth width.

16. The camera according to claim 13, wherein the first tooth portion has a first tooth height, the second tooth portion has a second tooth height; wherein the transparent substrate has a central axis, the first ring-shaped prism is nearer to the central axis as compared with the second ring-shaped prism, and the first tooth height is less than the second tooth height.

17. The camera according to claim 13, wherein the first tooth portion has a first side face, the second tooth portion has a second side face, and a curvature of the first side face is different form a curvature of the second side face.

18. The camera according to claim 12, wherein each of the secondary optical elements comprises a third ring-shaped prism, a width of the third ring-shaped prism is greater than the width of the second ring-shaped prism, the third ring-shaped prism surrounds an outer periphery of the second ring-shaped prism, and a cross-section of the third ring-shaped prism is dentate and comprises a third tooth portion adjacent to the second tooth portion.

19. The camera according to claim 18, wherein a shape of the first tooth portion, a shape of the second tooth portion, and a shape of the third tooth portion are different from each other.

* * * * *